Oct. 5, 1948.  C. F. PARKER  2,450,523
PORTABLE TILE CUTTER
Filed April 18, 1947  2 Sheets-Sheet 1
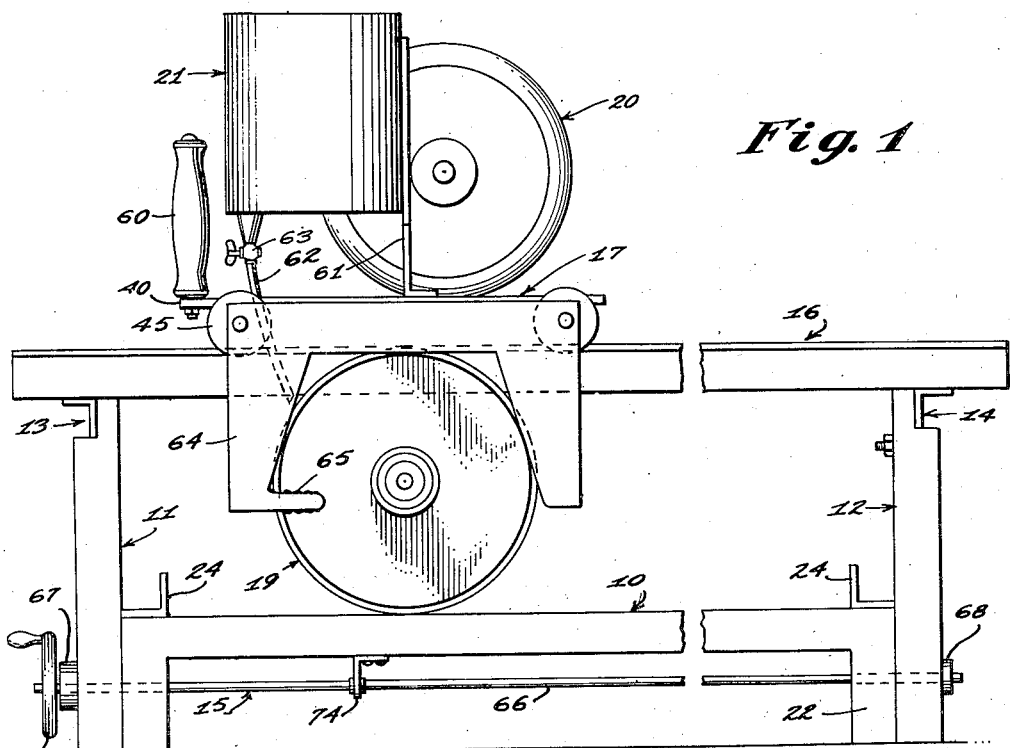
Fig. 1
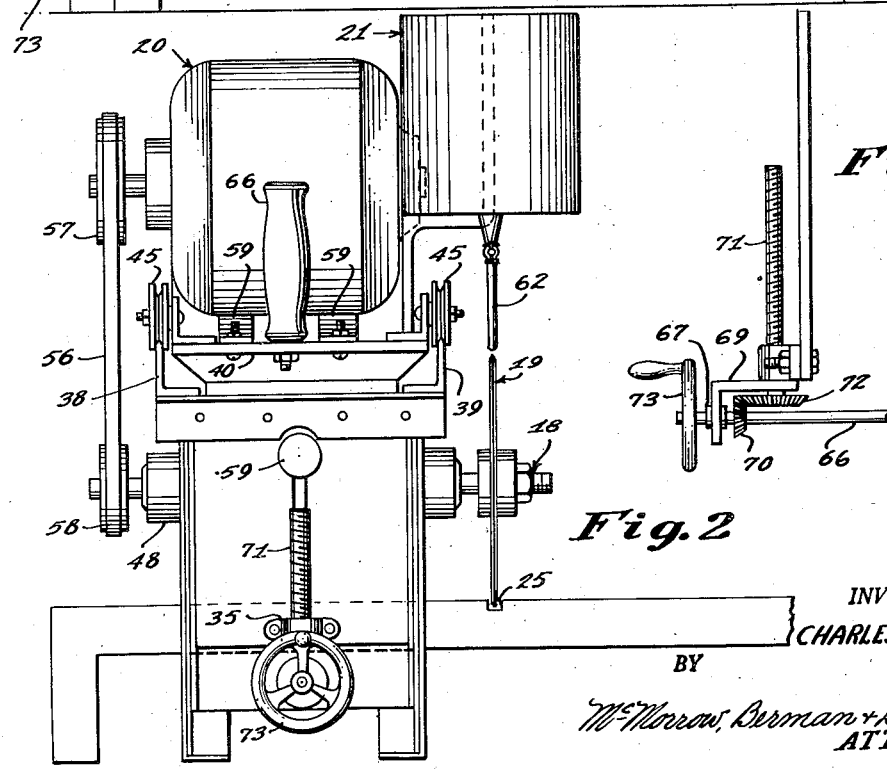
Fig. 7
Fig. 2
INVENTOR.
CHARLES F. PARKER
BY
McMorrow, Berman + Davidson
ATTORNEYS Oct. 5, 1948.     C. F. PARKER     2,450,523
PORTABLE TILE CUTTER
Filed April 18, 1947     2 Sheets-Sheet 2
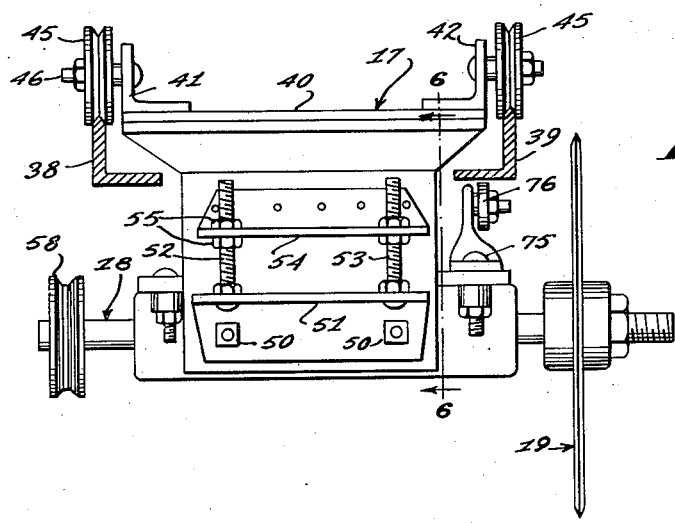
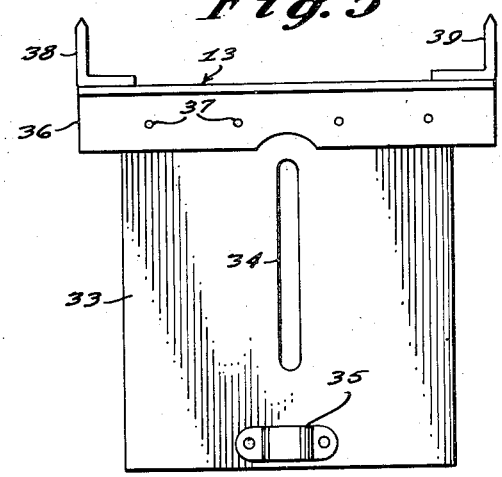
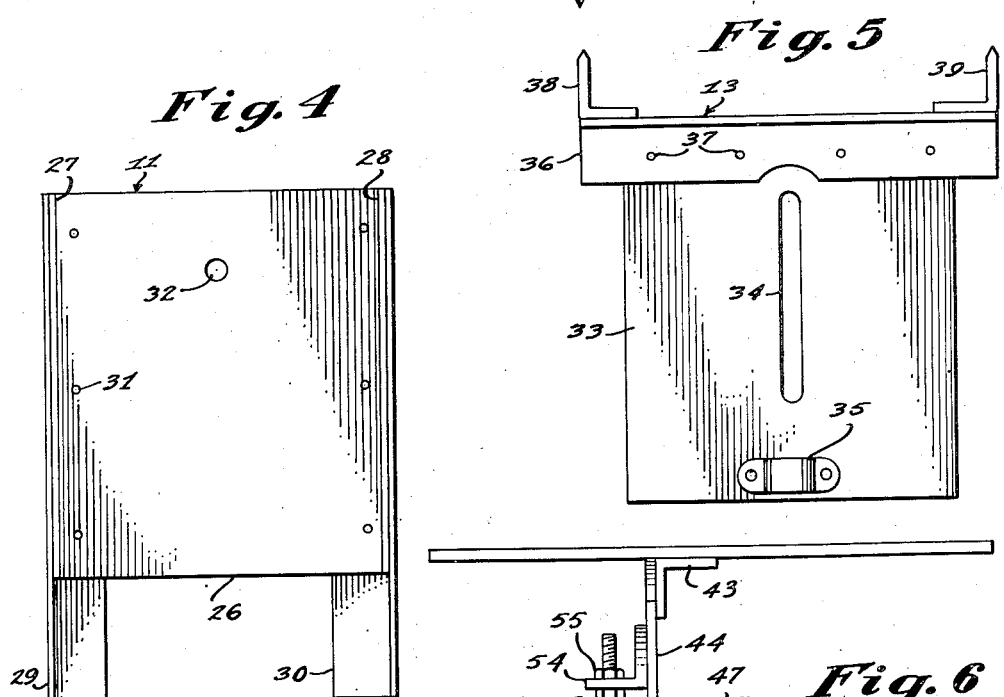
INVENTOR.
CHARLES F. PARKER
BY
McMorrow, Berman + Davidson
ATTORNEYS Patented Oct. 5, 1948

2,450,523

UNITED STATES PATENT OFFICE 2,450,523

PORTABLE TILE CUTTER

Charles F. Parker, Culver City, Calif.

Application April 18, 1947, Serial No. 742,411

2 Claims. (Cl. 125—14)

This invention relates to improvements in portable cutting or sawing machines and more particularly to an improved portable machine for cutting tile, slate, paving stone and other flat objects of hard material.

It is among the objects of the invention to provide an improved tile cutting machine of compact form and light weight which may be conveniently carried from place to place as a unit so that tile, slate, stone, etc., may be conveniently cut or trimmed on the job, and to provide such a portable machine that is accurate in operation, durable in use, convenient to operate, is capable of cutting objects of large as well as of small size and of varying thickness, which is simple in construction, economical to manufacture and is capable of long periods of service without requiring adjustment or repair.

Other objects and advantages will become apparent from a consideration of the following description in conjunction with the accompanying drawings wherein:

Fig. 1 is a side elevational view of an improved tile cutting machine illustrative of the invention;

Fig. 2 is an end elevational view of the machine looking at the left hand end of the machine as viewed in Fig. 1, the guard for the cutting disc being omitted;

Fig. 3 is an end elevational view of the carriage portion of the device;

Fig. 4 is an elevational view of a fixed supporting member for the trackway upon which the carriage runs;

Fig. 5 is an elevational view of a movable supporting member carrying the trackway at its upper end;

Fig. 6 is a transverse sectional view on the line 6—6 of Fig. 3; and,

Fig. 7 is a detailed elevational view showing the construction of manually operable adjusting means for moving the movable support member of Fig. 5 relative to the fixed support member of Fig. 4.

With continued reference to the drawings, the improved tile cutting machine comprises generally, a flat table 10 having at the opposite ends thereof fixed support members 11 and 12 secured at their lower ends to the ends of the table, movable support members 13 and 14 operatively associated with the fixed support members 11 and 12 respectively, manually operable adjusting means 15 for moving the movable support members simultaneously relative to the fixed support members, a two-rail trackway 16 secured to the upper ends of the movable support members 13 and 14, a carriage 17 mounted upon wheels which ride upon the upper edges of the rails of the trackway 16, a saw shaft 18 journalled on the carriage and having a cutting disc or saw 19 fixed on one end portion thereof, a driving motor 20 supported on the carriage and drivingly connected with the shaft 18, and a receptacle 21 for cooling liquid also supported on the carriage 17.

Referring to the drawings in somewhat greater detail, the table 10 may conveniently be formed from a sheet or plate of strong and rigid but light weight material, such as aluminum, having the marginal portions thereof bent at right angles to the center portions to provide a marginal flange 22 which constitutes a base for the machine. Guide channels 24 are preferably secured on the upper surface of the table at the ends thereof to assist in supporting the work on the table, and a longitudinal groove 25 extends lengthwise of the table in the path of the saw or cutting disc 19, the edge of the disc being received in this groove when the disc is in its lowermost position relative to the table, as illustrated in Fig. 2.

Each of the fixed end members 11 and 12 comprises a flat rectangular metal plate, as indicated at 26 in Fig. 4, preferably having the vertical edges thereof bent outwardly to provide reinforcing flanges 27 and 28 and a pair of standards 29 and 30 of angular cross-sectional shape secured to the flanged edge portions of the plate 26 by suitable means such as the rivets 31 and extending below the bottom edge of the plate 26 a distance substantially equal to the height of the table 10. The plate 26 is provided in its upper central portions with an aperture 32 for a purpose which will presently appear.

Each of the movable supporting members, as illustrated in Fig. 5, comprises a rectangular metal plate 33 having a centrally disposed elongated aperture 34 therein, an internally screw threaded nut 35 secured to the bottom portion thereof at substantially the mid width position and a member 36 of angular cross sectional shape secured by one flange thereof to the upper end of the plate 33 by suitable means, such as the rivets 37.

When a movable support member, for example the member 13, is operatively associated with the corresponding fixed support member, for example the member 11, the plate 33 is guided by the flange portions 27 and 28 of the plate 26 so that the movable member is held in accurate alignment with the fixed member during relative movements of the two members.

The trackway 16 comprises two rail members 38 and 39 of angular cross sectional shape secured at their ends to the transverse members of the movable support members 13 and 14. The upper edges of these rail members are beveled to an inverted V-shape and are precision machined to provide a straight and accurate guideway for the supporting wheels of the carriage 17.

The carriage 17 may conveniently comprise a rectangular metal plate 40 and a pair of elongated angle brackets 41 and 42 secured, one along each lateral edge of the plate 40, a transverse angle bracket 43 secured to the under surface of the plate 40 intermediate the length of the plate and a depending support plate 44 secured at its upper end portions to the depending flange of the angle bracket 43. Supporting wheels 45 are secured to the brackets 41 and 42 by respective axle belts 46 extending through the vertical flanges of the brackets 41 and 42 and through the wheels. These wheels are provided with annular V-shaped grooves in the peripheries thereof and ride upon the inverted V-shaped upper edges of the track rails 38 and 39 so that the carriage can be moved in a straight line lengthwise of the table 10.

A bracket 47 having bearing blocks 48 secured to the under surface thereof has a flanged portion 49 positioned against one face of the depending plate 44 and is apertured to receive a bolt 50 which extends through a vertically elongated aperture in the plate 44 and through an aperture in an angle bracket 51 disposed at the opposite side of the plate 44 from the angle bracket 47. A pair of bolts or screw shafts 52 and 53 are secured at their lower ends to the lower angle bracket 51 and extends through corresponding apertures in an upper angle bracket 54 in which they are positioned by suitable opposed nuts 55. The adjustable connection between the lower angle bracket 51 and the upper angle bracket 54 provided by the bolts 52 and 53 and the clamp nuts 55 permits the bracket 47 to be raised and lowered and to be leveled relative to the trackway so that the shaft 18 journalled in the bearing blocks 48 can be accurately leveled and aligned relative to the top surface of the table 10 and so that the tension on the belt 56 which connects the motor drive pulley 57 with the shaft drive pully 58 can be adjusted. As indicated, the shaft 18 is journalled in the bearing blocks 48 and is driven from the motor 20 carried on the upper surface of bed plate 40 by suitable base members 59. A handle 60 is secured to one end of the plate 40 to provide convenient means for propelling the carriage 17 along the trackway and the cooling liquid container 20 is supported on a standard 61 secured to the plate 40 and projecting upwardly therefrom, liquid from the container being carried to the cutting disc 19 by a dispensing tube 62 extending from the bottom of the container and provided with a control valve 63.

A substantially rectangular guard 64 is provided over the upper portion of the cutting disc 19 and may be conveniently secured to the carriage 17 by having the two corresponding wheel carrying axle bolts extend through the upper corners of the guard. This guard may carry wipers or sponges 65 for distributing the cooling fluid over the edge portions of the cutting disc.

The manually controlled adjusting means 15 comprises a longitudinal shaft 66 extending lengthwise beneath the table 10 from one end thereof to the other and journalled in suitable bearings 67 and 68 secured to the fixed supporting members 11 and 12 by angle brackets one of which is illustrated in Fig. 7 and indicated at 69. The shaft has two beveled gears 70 secured there- on one adjacent each of the fixed support members and two screw shafts 71 are journalled at their lower ends in corresponding angle brackets and extend through the nuts 35 on the respective movable supporting members. Each of these screw shafts has on the lower end thereof a beveled gear 72 meshing with the corresponding beveled gear 70 on the shaft 66. A crank or hand wheel 73 is fixed on one end of the shaft 66 so that the shaft can be manually rotated and in turn rotates the screw shafts 71 to simultaneously move the movable support members 13 and 14 up and down relative to the fixed support members 11 and 12.

A bolt 59 extends through the aperture 32 in each fixed support member and through the corresponding elongated aperture 34 in the respective movable support member and is provided with a hand rotatable nut so that the movable and fixed support members can be clamped together in adjusted positions when desired. One or more brackets 74 may be secured to the under surface of the table 10 and rotatably receive the shaft 66 to support the intermediate portion of the shaft between the ends of the table.

A bracket 75 is secured on the upper surface of the angle bracket 47 and carries at its upper end a small ball bearing mounted roller 76 which rides under the under surface of the track rail 39 to hold the carriage supporting wheels associating with that rail firmly in position on the rail and prevent the cutting disc 19 from moving up and down during the cutting of a piece of work supported on the table 10.

The table may be provided with suitable work guides, miter gauges, vises or clamps and other equipment necessary or convenient to the proper positioning and holding of the work thereon for the cutting operations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A portable tile cutting machine comprising a rigid table of light weight material; a trackway above and substantially parallel to said table; means adjustably supporting said trackway from said table; manually operable adjusting means operatively associated with said supporting means to vary the distance between said trackway and said table; a carriage having wheels supported on said trackway; a bracket adjustably secured to a depending carriage portion; a shaft journalled on said bracket; a motor mounted on said carriage; a belt drive between said motor and said shaft; means adjustably connecting said shaft carrying brackets to said depending platform portions whereby said shaft may be moved to adjust the tension of said shaft driving belt; and a cutting disc fixed on one end portion of said shaft.

2. A portable tile cutting machine comprising a flat table having upwardly extending fixed supports, one at each opposite end thereof and each comprising a flat plate and a pair of angle-iron guide members secured one along each of two opposite edges of the plates, a movable support operatively associated with each fixed support and comprising a flat plate with a track-supporting angle-iron member across the top edge thereof, a track way connected at its ends to the angle-iron track supports of said movable supports, manually operable means operative to simultaneously move said movable supports up or down relative to said fixed supports, a wheeled carriage supported on said track way for movement lengthwise thereof, a shaft bearing adjustably secured for said carriage, a shaft journalled in said bearing and extending transversely of said track way, a cutting disc fixed on said shaft, a driving motor carried by said carriage, means drivingly connecting said motor with said shaft, and a handle secured to said carriage for manual movement of said carriage along said track way.

CHARLES F. PARKER.

REFERENCES CITED

The following references are of record in the file of this patent:

UNITED STATES PATENTS

| Number | Name | Date |
|---|---|---|
| 637,961 | Gillies | Nov. 28, 1899 |
| 1,097,034 | Lautz | May 19, 1914 |
| 1,716,279 | Owen | June 4, 1929 |
| 1,906,739 | Carruthers | May 2, 1933 |
| 2,195,108 | Graff | Mar. 26, 1940 |
| 2,323,744 | Wikle | July 6, 1943 |

FOREIGN PATENTS

| Number | Country | Date |
|---|---|---|
| 5,296 | Great Britain | Mar. 3, 1910 |